(12) United States Patent
Björndahl

(10) Patent No.: US 6,901,241 B2
(45) Date of Patent: *May 31, 2005

(54) SYSTEM, METHOD AND APPARATUS FOR SECURE TRANSMISSION OF CONFIDENTIAL INFORMATION

(75) Inventor: Per Björndahl, Lidingö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 226 days.

This patent is subject to a terminal disclaimer.

(21) Appl. No.: 09/232,289

(22) Filed: Jan. 15, 1999

(65) Prior Publication Data

US 2002/0065099 A1 May 30, 2002

Related U.S. Application Data

(63) Continuation-in-part of application No. 09/022,289, filed on Feb. 11, 1998, now Pat. No. 6,396,612.

(51) Int. Cl.⁷ ................................................ H04B 7/00
(52) U.S. Cl. .................. 455/41.2; 455/41.1; 370/335; 398/119; 398/135; 359/172
(58) Field of Search ............................ 455/41.1, 41.2, 455/39, 103, 74, 552.1, 553.1, 127.4, 550.1, 15, 57, 134, 303, 603, 127, 352, 67.4, 67.7, 226.1, 226.4, 38.1, 38.2, 228, 229, 277.1, 277.2; 370/339, 468, 277, 310, 335; 359/172, 152, 145, 155, 158; 398/135, 106–107, 115–118; 340/825.94

(56) References Cited

U.S. PATENT DOCUMENTS

| | | | |
|---|---|---|---|
| 4,856,046 A | 8/1989 | Streck et al. ............... 379/56 |
| 4,904,993 A * | 2/1990 | Sato ........................... 340/570 |
| 5,034,997 A * | 7/1991 | Iwasaki ...................... 455/617 |
| 5,301,353 A * | 4/1994 | Borras et al. ................. 455/9 |
| 5,404,572 A * | 4/1995 | Ishii ........................... 455/67.4 |
| 5,446,783 A | 8/1995 | May ............................. 379/59 |
| 5,479,595 A * | 12/1995 | Israelsson ................... 398/115 |
| 5,508,836 A | 4/1996 | DeCaro et al. ............. 359/189 |
| 5,564,020 A | 10/1996 | Rossi ..................... 395/200.15 |
| 5,585,953 A * | 12/1996 | Zarvel ........................ 359/151 |
| 5,588,009 A | 12/1996 | Will ............................. 371/33 |
| 5,608,723 A * | 3/1997 | Felsenstein ................. 370/335 |
| 5,617,236 A | 4/1997 | Wang ......................... 359/172 |
| 5,617,449 A | 4/1997 | Tanaka ....................... 375/222 |
| 5,636,264 A | 6/1997 | Slavuori et al. .............. 379/56 |
| 5,812,293 A * | 9/1998 | Yen ............................. 359/145 |
| 5,819,184 A | 10/1998 | Cashman .................... 455/553 |
| 5,835,862 A | 11/1998 | Nykanen et al. ........... 455/558 |
| 5,850,444 A * | 12/1998 | Rune ............................ 380/21 |
| 5,884,939 A | 3/1999 | Yamaji et al. .............. 375/219 |
| 5,915,021 A * | 6/1999 | Herlin et al. ................. 380/21 |
| 5,917,425 A * | 6/1999 | Crimmins et al. ...... 340/825.49 |
| 5,946,120 A * | 8/1999 | Chen .......................... 359/158 |
| 6,396,612 B1 * | 5/2002 | Bjorndahl ................... 398/121 |

FOREIGN PATENT DOCUMENTS

| | | |
|---|---|---|
| DE | 196 294 08 A1 | 7/1996 |
| EP | 756 397 A2 | 7/1996 |
| EP | 806 878 A2 | 5/1997 |

* cited by examiner

Primary Examiner—Pablo N. Tran
(74) Attorney, Agent, or Firm—Jenkens & Gilchrist, P.C.

(57) ABSTRACT

A system, method and apparatus for establishing a secure wireless radio communications link between two devices that minimizes the exposure of sensitive information to third party interception is disclosed. The secure link is established by first establishing an infrared link between the two devices for the exchange of sensitive information, such as encryption information. Subsequent communications would then have the benefit of encryption protection, establishing the secure wireless radio communications link.

21 Claims, 3 Drawing Sheets

SYSTEM, METHOD AND APPARATUS FOR SECURE TRANSMISSION OF CONFIDENTIAL INFORMATION

CROSS REFERENCE TO RELATED APPLICATIONS

This application is a continuation-in-part of Assignee's U.S. patent application Ser. No. 09/022,289, entitled "System, Method and Apparatus for Secure Transmission of Confidential Information", filed on Feb. 11, 1998 now U.S. Pat. No. 6,396,612, and incorporates by reference Assignee's co-pending U.S. patent application Ser. No. 08/845,938, entitled "Combined Mobile Telephone and Remote Control Terminal", filed on Apr. 29, 1997.

BACKGROUND OF THE PRESENT INVENTION

1. Field of the Invention

The present invention relates generally to a system, method and apparatus for establishing a secure wireless communications link between two devices that minimizes the risk of third party interception of sensitive information, such as may be exchanged during communication initialization.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the least ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Cordless telephony has also been a part of the exponential rise in wireless telephony. Cordless telephones were originally aimed at providing economical, tetherless voice communications inside residences, i.e., using a short wireless link to replace the cord between a telephone base unit and its handset. Although early cordless phones were of marginal quality, with the introduction of improved cordless phones in the 1980s sales dramatically increased. More recent advances, particularly in Europe, have extended the use domain of cordless phones outside of residences.

Another European revolution of cordless telephones is the digital enhanced cordless communications (DECT) standard, which was optimized for use inside buildings. DECT controllers may hand off active calls from one base unit to another as the users move, and can page or ring handsets as a user walks through areas covered by different base units. As is understood in the art, however, the range of cordless telephones is greatly limited compared to the more versatile cellular telephones, i.e., 0.3–30 or more kilometer range for cellular and less than 100 meters in cordless systems, and usually only up to tens of meters.

More recently, the worlds of cellular and cordless telephony have begun to converge with the introduction of cordless standards compatible with that of its cellular cousin. Accordingly, a mobile cellular user may utilize their cellular telephones within a cordless telephony system, thereby avoiding the need to purchase proprietary and typically non-compatible cordless telephones. Shown in FIG. 1 is a private telephone system, generally referred to by the numeral 10, having at least one private base station 12 and a multiplicity of cellular phones 14 in communication therewith. When in a cordless mode a cellular user, e.g., at phone 14A, may communicate with another user within the private telephone system 10, e.g., another cordless-mode cellular phone 14B or a cordless phone 16, via the private base station 12 which serves as a relay.

One problem with the use of the cellular phones 14 within the private telephone system 10 is security. As discussed, original cordless telephones, e.g., phones 16 in FIG. 1 were stand-alone consumer products that did not require any interoperability specifications. In other words, each cordless phone came with its own base station and needed to be compatible only with that base station. Billing, security and privacy concerns within such systems were addressed by both preventing that cordless phone from operating with any other base station and limiting the transmission range of the cordless phones. With the convergence of cordless and cellular technologies and the use of interoperability specifications, however, the inherent physical limitations of the cordless systems no longer serve a security function. With cellular phones 14 being capable of transmitting their signals over many kilometers, the use of such phones within private telephone systems 10 raise genuine security considerations.

As is understood in the art, cellular phone 14A may communicate through the private base station 12 by use of encryption keys or other such security protocol, whereby the messages are encrypted and more difficult to decipher. Accordingly, even though the communications from a cellular user communicating within the private telephone system 10 may extend well outside the outer reaches of the system 10, the conversation or data exchanged is kept relatively confidential. Another problem, however, arises during communication initialization over the radio interface which must occur without encryption since no encryption keys have been exchanged between the cellular user, e.g., of cellular terminal 14A. The information is therefore being broadcast across a wide range, including the keys, until encryption protocols are established. Accordingly, third parties may listen in on such pre-encryption transmissions and acquire sensitive information.

Various techniques may be employed to thwart such eavesdropping. A first approach is to use a wireline connection for the initial information exchange, whereby the cellular phone 14A must be electrically connected to the private base station to start the private communication. This approach would, accordingly, require the definition of an electrical interface between the two components and limit the manufacturer's freedom to design attractive terminals since a standardized connector may increase the size and weight of the terminal. Further, such a definition may also restrict further improvements of such phones 14, e.g., moving to lower voltage technologies for energy conservation and size deduction.

An alternative approach would be using Subscriber Identity Modules (SIMs) in both the private base station 10 and the respective cellular terminal 14, whereby the requisite identification information is readily established and the proper keys applied without transmitting them. In addition to the added component costs, the use of two SIMs in this manner also adds to the administrative costs of mobile network operators who must allocate unique SIM pairings between the private base stations 20 and respective cellular terminals 14. Furthermore, there is a risk that a SIM meant for the cellular terminal 14 may instead be inserted into the private base station 12, further complicating this approach.

A third approach is to utilize the advantages of the radio interface, e.g., standardization. As discussed, however, because radio waves propagate through walls and over large distances, this also poses a security risk which must be overcome.

In view of the disadvantages of each of the aforementioned approaches, it is clear that there is a need for a simple and secure system and method for establishing a communications link between a first device, such as a cellular phone, and another device, such as a private base station.

It is, accordingly, an object of the present invention to provide a system, method and apparatus for establishing such a simple and secure communications link, whereby at least a portion of a transmission, particularly one containing sensitive information, may be transmitted clearly for proper reception while simultaneously minimizing the risk of interception.

It is a further object of the present invention to provide additional systems, methods and apparatuses that securely transmit confidential or sensitive information for establishing a connection between a first and a second device that communicate via radio links, e.g., a lap-top computer and a peripheral device such as a printer.

It is another object of the present invention to provide a secure wireless transmission link between any two devices, whether in the work-place or at home, e.g., a computer which receives an Internet command to turn on the heat in an apartment. After the establishment of the secure link, using the systems, methods and apparatuses of the present invention, the two devices may then communicate via short- or long-range wireless radio links without the need for proprietary cables or other physical interconnection.

SUMMARY OF THE INVENTION

The present invention is directed to a system, method and apparatus for establishing a secure wireless radio communications link between two devices that minimizes the exposure of sensitive information to third party interception. The secure link is established by establishing an infrared link between the two devices for the exchange of sensitive information, such as encryption information. Subsequent communications would then have the benefit of encryption protection, establishing the secure wireless radio communications link.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The use of infrared (IR) transmissions between diverse electronic devices, e.g., between a television and a remote controller, are known, e.g., U.S. Pat. Nos. 5,508,836, 5,588,009, 5,564,020, 5,617,236 and 5,446,783 each describe various IR-electronic interconnections. U.S. Pat. No. 5,636,264 similarly describes an IR interface between a phone handset and a computer. Although generally describing the usage of IR in these contexts, the references fail to discuss the aforementioned security problems inherent in wireless communications nor the proposed solution set forth in the present invention, described in more detail hereinafter.

Figure 2:
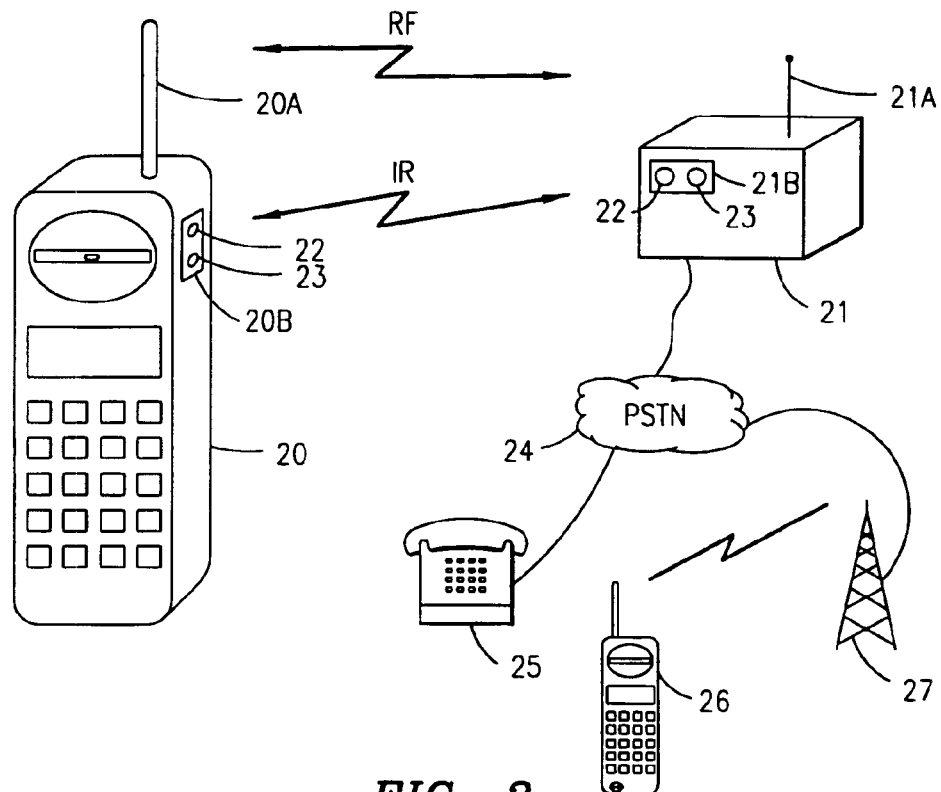
FIG. 2 illustrates a dual-mode radiofrequency and infrared mobile station and private base station in accordance with the present invention.

Shown in FIG. 2 is a dual mode mobile station 20 in communication with a dual mode private base station 21. As discussed, mobile station 20 communicates with the private base station 21 via an RF transmission, which has an effective range of hundreds of meters, and via a more limited, "cordless" communications mode having a much shorter, contained range. As is understood in the art, the RF transmission mode is via the respective antennae 20A and 21A of the mobile station 20 and private base station 21, respectively, the signals being transceived in a conventional manner.

Also shown in FIG. 2 are IR transceiver interfaces 20B and 21B on the mobile station 20 and private base station 21, respectively. Each interface preferably includes a photodetector 22 for receiving IR signals and an IR signal emitter 23 for transmitting such IR signals. It should be understood that the position of the interfaces 20B and 21B on the respective bodies of the mobile station 20 and the private base station 21 are arbitrary, provided the respective IR signals to and from the interfaces 20B and 21B are not blocked, e.g., by the palm or fingers of the phone user. In other words, ergonomic considerations may dictate particular placements for the interfaces, as is understood in the art.

With further reference to FIG. 2, one of the practical utilizations of the dual-mode mobile station 20 is now illustrated. In particular, when the dual-mode mobile station 20 comes within the more limited range of the private base station 21, e.g., in the same or an adjacent room, the subscriber may wish to transfer control from the cellular provider to the private system, e.g., to save money on the cheaper wireline phone rates through the private system to the Public Switched Telephone Network (PSTN). For example, through the PSTN 24, the mobile station 20 can communicate with remote wireline phones 25 and remote cellular phones 26 via a base transceiver system 27 (shown for simplicity as a base transceiver station tower).

Figure 3:
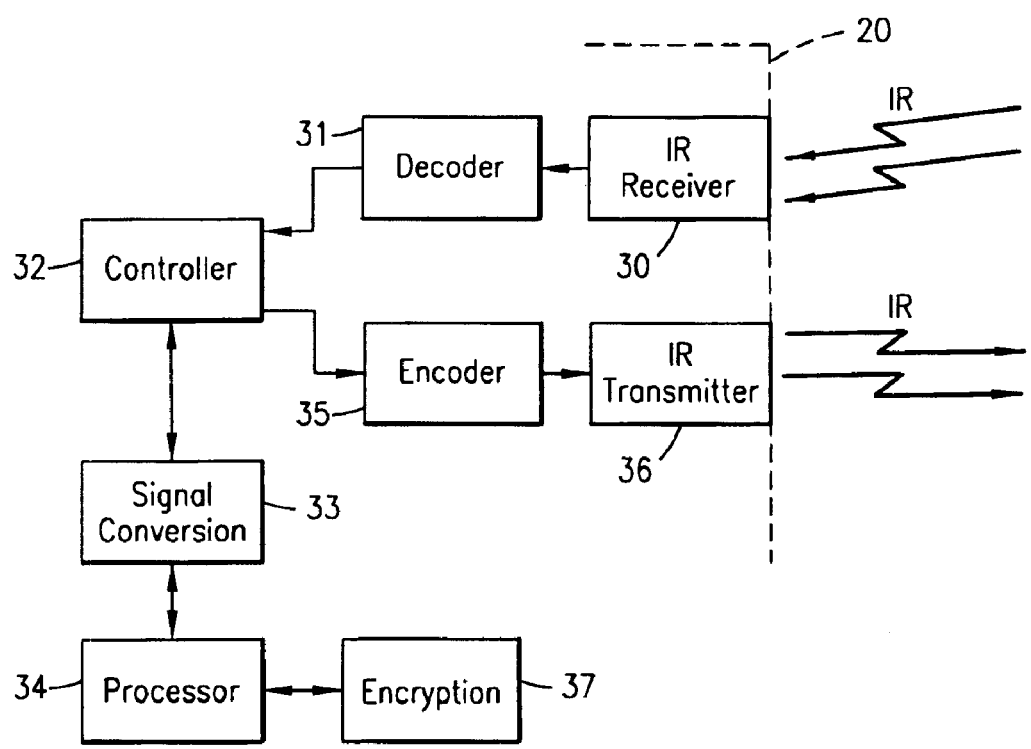
FIG. 3 illustrates various circuitry employed in the dual-mode devices shown in FIG. 2.

With reference now to FIG. 3 of the drawings, there is illustrated a portion of the mobile station 20 (in FIG. 2), particularly, the IR transceiver interface 20B and various circuitry within the mobile station 20 for handling the IR signals. An IR receiver or photodetector 30 receives the IR signals, such as from the private base station 21, and passes the signals to a decoder 31, which converts the infrared information within the IR signal to electrical information, e.g., digital pulses. The converted information is then forwarded to a controller 32, which controls the flow of the electrical information (pulses). A signal conversion device 33 receives the aforesaid electrical information flow and groups the incoming pulses into a unit size (frame) pursuant to a known signal format. The controller 32 may be a UART or other like controller, as is understood in the art.

Figure 1:
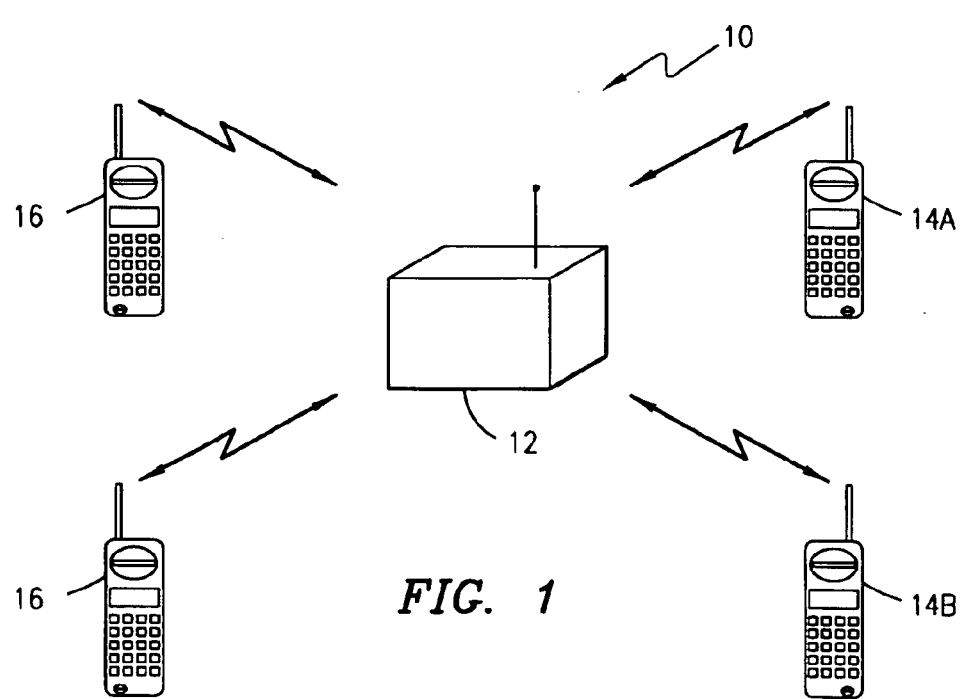
FIG. 1 is a schematic illustration of a private telephone system, including a private base station with cellular and cordless phones in communication therewith.

The incoming signal, now translated, is sent to a processor 34, which implements the command(s) set forth in the signal, e.g., forward the incoming signal to another phone such as mobile station 14B (in FIG. 1) across the RF communications link. Similarly, the processor 34, in response to one or more commands, may send a message across the IR communications link by first forwarding the message to the signal conversion device 33, which converts the structured message into the aforesaid electrical information or pulses, which the controller 32 sends to an encoder 35. The electrical pulses are there converted to IR radiation signals which are then transmitted by an IR transmitter 36, e.g., light emitting diodes, releasing the IR signal.

It should, of course, be understood that the circuitry shown in FIG. 3 is preferably also incorporated within the private base station 21 so that a wireless IR dialogue may be established with the mobile station 20.

As discussed, the effective range of the IR signal so emitted is limited, e.g., on the order of several dozens of meters. With obstacles like walls, floors and ceilings, the effective range is even further reduced, as is encountered by consumers with products such as television remotes. Accordingly, IR signals provide an excellent way to exchange confidential information wirelessly, effectively limiting communications to a point-to-point conversation, albeit preferably temporarily until the security protocols are safely established. Eavesdropping, although still possible, is thwarted by such range restrictions since other security measures, e.g., building control, may be employed in conjunction to provide almost any level of interception prevention.

Since various encryption methods are available to make a wireless conversation almost impervious to code-breakers, wireless communications between a user of the dual-mode phone 20 (in FIGS. 2 and 3) preferably switches to the RF communications mode to utilize the enhanced security advantages of encryption to prevent deciphering. Wireless RF communications, however, even with encryption, are easily intercepted by a distant eavesdropper. Although encryption data may thwart the eavesdropper's deciphering the intercepted coded message, the caller and recipient must first establish the secure transmission through the exchange of encryption keys over a non-encrypted wireless communication, which the eavesdropper can monitor, easily decipher the pertinent keys and then decipher the supposedly secure encrypted transmissions.

The system, method and apparatus of the present invention provide an improved, more secure way to preserve the confidentiality of wirelessly transmitted information by restricting exposure of the encryption keys and any other confidential information through use of the aforementioned IR transmissions.

In one embodiment of the present invention the subscriber of mobile station 20 when sufficiently close to the private telephone system, e.g., near the private base station 21, activates the mobile station 20 to emit an IR signal, e.g., via IR transmitter 36. Alternatively, the mobile station 20 may activate IR signaling capability automatically in advance of transceiving any security-related data. In a preferred embodiment of the present invention, the mobile station utilizes conventional radiofrequencies for all non-security-related transmissions, e.g., when initiating communications with the private base station 21 such as a cordless telephone base station and after the exchange of encryption or other such security data. Upon reaching the aforementioned security data or protocols in the transmission, the mobile station 20 then switches over to the aforementioned IR signaling using the IR transmitter 36. It should be understood, that the RF-to-IR switchover may occur early in the transmission, e.g., in the initial communications attempts, or later during the transmission, so long as any secured portions of the signal are transmitted via IR transmissions.

In either event, the private base station 21 detects the IR signal transmission from the mobile station 20, via the aforementioned photodetector 30 in the station 21, processes the incoming IR signal, and responds with an IR response signal, which preferably includes an encryption key. It should be understood that one or more encryption keys may be inserted into the response signal by an encryption device 37 in communication with the processor 34. Upon the secure receipt of the encryption key(s) from the private base station 21 via IR transmission, the mobile station 20 may then safely begin/resume wireless RF communications, which are now encrypted pursuant to the embedded encryption key(s). The subscriber is then able to move more freely throughout the building, all the while taking advantage of the inexpensive wireline communications link through the PSTN 24, as discussed hereinbefore.

In another embodiment of the present invention, the private base station 21 may periodically emit an IR signal, which the mobile station 20 may intercept, if close enough. In effect, the private base station may perform an IR poll to establish the preliminary IR linkage to exchange security information, such as the aforedescribed encryption keys. For example, upon detection (in photodetector 30), the mobile station 20 may (like the private base station 21 in the previous embodiment) also respond with an IR response signal, which may include encryption key(s) for governing the subsequent RF transmissions with the private base station 21, thereby providing a procedure for periodic or random security measures.

In still another embodiment of the present invention, the more secure IR communications link may be employed by the subscriber of the mobile station 20 or an administrator of the private telephone system to transfer other, non-initialization-related information. For example, if particularly sensitive information needs to be transmitted during an RF communication, the mobile station 20 and private base station 21 may switch to the more private IR communications mode and resume the RF mode transmissions after the sensitive information has been transferred. It should also be understood that the mobile station 20 and private base station 21 may automatically revert to the IR communication mode while in range of each other and only switch over when the IR transmissions begin to deteriorate.

Although one preferred embodiment of the present invention utilizes the principles of the present invention in the context of mobile telephony, it should be understood that the scope of the present invention, as set forth in the claims hereinbelow, covers a variety of dual-mode wireless interconnections using an infrared mode for security purposes.

Figure 4:
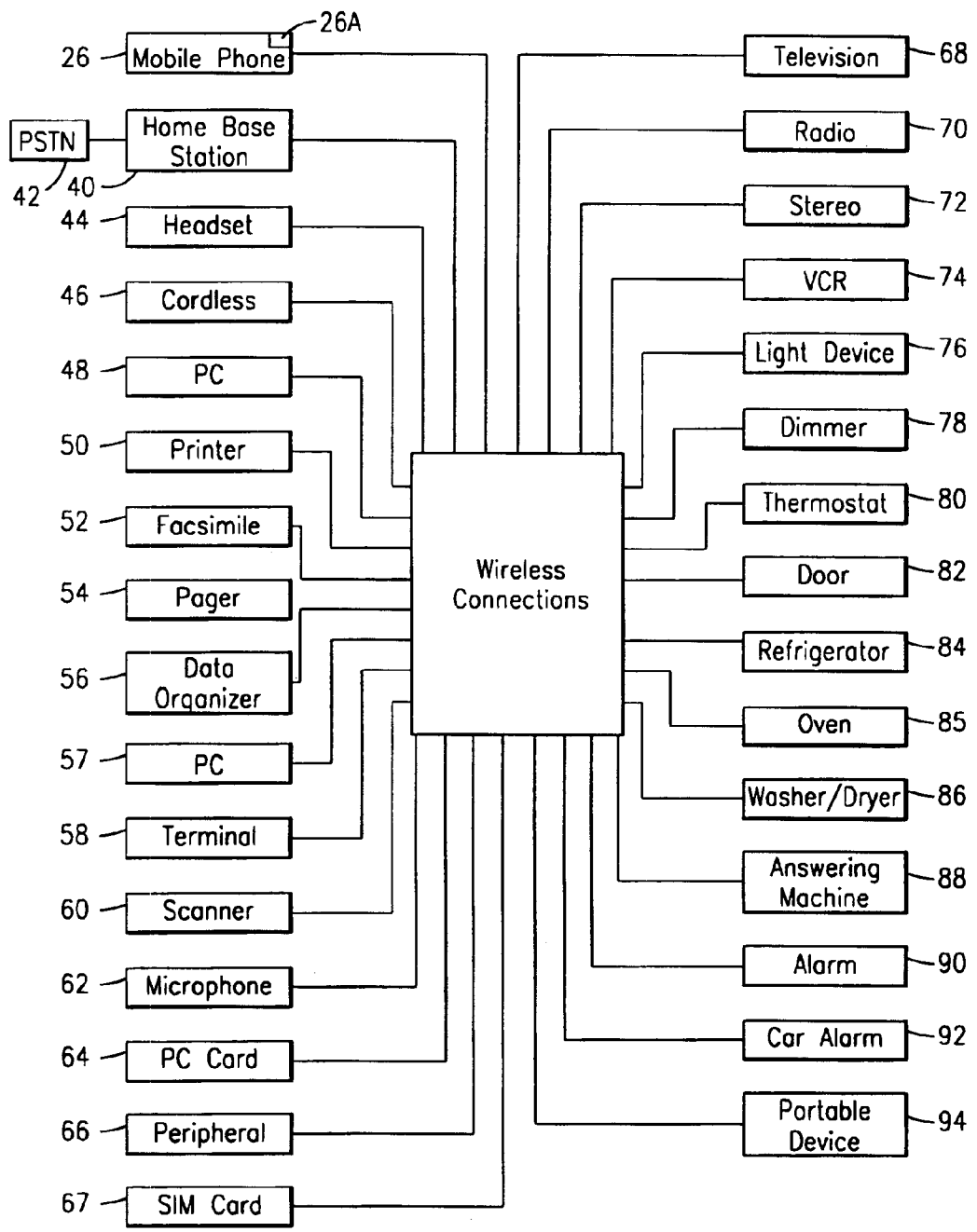
FIG. 4 illustrates a variety of devices that communicate with each other using the principles of the present invention.

With reference now to FIG. 4, there is illustrated a further embodiment of the present invention in which a first device, such as a mobile phone, a headset on a user or a computer, communicates with at least one of a large number of other devices, such as set forth in detail in Assignee's pending patent application entitled "Combined Mobile Telephone and Remote Control Terminal", U.S. patent application Ser. No. 08/845,938, filed Apr. 29, 1997, incorporated herein in its entirety by reference. It should be understood that although all of the various devices depicted in FIG. 4 may be able to communicate with each other, certain pairings may not be utilized (at present) For example, a printer 50 (receiving commands from a personal computer or PC 48) need not communicate with a television 68, although the television 68 could transmit an image for printing at the printer 50. The printer 50, however, could well forward a printing completion message (or out-of-paper or error message) to the PC 48 (using the security measures of the instant application or not).

Recent initiatives, such as the Bluetooth Mobile Communications Initiative, are promoting the increase in interoperability of the various electrical, electronic and mechanical devices utilized in the work place and at home. A number of the various devices capable of using the Bluetooth or other like technology are illustrated in FIG. 4, including a home base station 40 which is linked to a conventional Public Switched Telephone Network (PSTN) 42, converting the wireless rf and infrared signals received from other devices, such as the dual-mode phones 26 (shown in FIG. 2), a wireless headset/hands-free unit 44 or other cordless device 46. The desk-top or lap-top PC 48 may also interact with a number of additional peripheral devices, e.g., printer/plotter/projector 50, a facsimile 52, a pager 54, a data organizer 56 or other such personal, hand-held organizer device (enabling the download of sensitive information both to and from the organizer 56 and synchronization with data stored in the PC 48, another PC 57 or an electronic data terminal 58), a scanner 60, microphone 62, a PC card 64 and numerous other such peripherals, generally designated by the reference numeral 66. Of course, the principles of the present invention are also applicable in the mobile station 26 and a SIM card 26A, such as the one associated therewith, or a SIM card 67 separate from mobile station 26 as illustrated in FIG. 4.

In the home, numerous other household devices may be equipped with the dual-mode functionality such as set forth in the present invention. For example, the PC 48 may intercommunicate with the television 68, a radio 70, a stereo 72 or peripheral attached thereto, or a VCR or other video player 74 (tape or disk). Other interconnected devices in the home include a light device (lamp) 76, a dimmer switch 78, a thermostat 80 to control heating/cooling of a domicile, a door device 82 such as a garage door, a refrigerator/freezer 84, a cooking device 85 (microwave, gas, etc.), a washer/dryer 86, an answering machine 88 and an alarm device 90. Additional devices that may include the inventive techniques of the present invention include a car alarm 92 (with a car lock feature), which to operate in infrared mode must be in close proximity, preferably also in line-of-sight, and other external alarm devices which may be stationary.

Utilizing the principles of the present invention, secure communications may be established, via the infrared and wireless links, enabling a user, e.g., through voice or keyed-entry commands entered into a handheld or wrist (watch) communication device, generally designated by the reference numeral 94, to open their garage door 82, exit and lock their car, disarm their home alarm devices 90, and enter their domicile which has been heated/cooled by a prior remote command to the thermostat 80 (relayed wirelessly by the home PC 48).

It should be understood that although the plethora of wirelessly interconnected devices, such as specified pursuant to the Bluetooth initiative, may utilize low-cost, short-range radio links instead of the expensive, cumbersome and proprietary cabling now required, the need for securing these rf transmissions, which may range for a hundred meters or more, is critical since an unauthorized user could easily eavesdrop, intercept and decrypt these communications, thereby gaining access to the personal domain and effects of a user. The initial, more secured infrared transmissions of the present invention, requiring close proximity, more line-of-sight security data exchanges, provide the requisite level of protection necessary in these open-to-tampering systems.

Frequency spectrums available for these private applications are, at present, rather limited. In the United States, for instance, bands at 900 MHZ, 2.4 GHz and 5.7 GHz are currently unlicensed and may be used freely, provided the transmission (TX) power levels are low or spreading is applied. The Bluetooth initiative is scheduled to operate at the globally-available 2.45 GHz Industrial, Scientific, Medical (ISM) 'free band', allowing international travelers to employ Bluetooth-enabled equipment worldwide. It is understood to those skilled in the art that in an effort to avoid interference, spreading should be applied either by Frequency Hopping (FH) or direct-sequence (DS) spread spectrum. The 2.45 GHz ISM band may be used for a variety of devices and constitutes a band ranging from about 2.4 GHz to about 2.483 GHz, as described in Assignee's co-pending patent application entitled "Method and Apparatus for Tracking a Mobile Phone". As discussed in said patent application, describing frequencies in a phone tracking system, in an effort to avoid sharp filters to fulfill out-of-band emission requirements, the applied radio band is preferably placed away from the ISM band edges. Known interference areas, e.g., from 2.435 GHz to 2.465 GHz in which microwave ovens operate, are preferably avoided as well. Frequency Shift Keying (FSK) can be used to map the user code on the rf carrier. In such an FSK modulation technique, a bit representing 'one' is mapped to the frequency rf+Df, and a bit representing 'zero' is mapped to the frequency rf−Df (or vice versa) where rf is the carrier frequency and Df is the frequency deviation, which should be large enough to combat the frequency offset between the transmitter and the receiver. For example, if inaccurate frequency references (with an accuracy of about 50 parts per million) are used, the worst-case frequency offset can reach up to 240 KHz. In order to receive the burst in such a case, the frequency duration Df should be greater than 240 KHz.

It should be understood that although GSM technology is presently preferred, the principles of the present invention may also be employed in other Time Division Multiple Access (TDMA), Personal Digital Cellular (PDC) and presently developed (and future) third generation systems and equipment. Consequently, the various frequencies used by these and other systems, e.g., 800, 900, 1500, 1800, 1900, 2000 and 2100 MHz bands, may also be employed in the system, method and apparatus of the present invention.

The previous description is of preferred embodiments for implementing the invention, and the scope of the invention should not necessarily be limited by this description. The scope of the present invention is instead defined by the following claims.

What is claimed is:

1. A communications system for secure wireless communications, said communications system comprising:

a first device having transceiving means therein for communicating in a first and a second communication mode;

a second device, in wireless communication with said first device, said first and second devices wirelessly communicating in said first communication mode using an infrared signal and in said second communication mode using a radiofrequency signal;

wherein said first and second devices transceive a plurality of messages therebetween in said second communication mode;

wherein, prior to transceiving a security message therebetween, said first and second devices switch transceiving to said first communication mode, and transmit said security message in said first communication mode;

wherein, upon said second device switching said transceiving to said first communication mode, said second device transmits an infrared request message to said first device.

2. The communications system according to claim 1, wherein said first and second devices, upon completion of the transceiving of said security message, switch transceiving therebetween to said second communication mode.

3. The communications system according to claim 1, wherein said security message comprises a plurality of encryption keys for the subsequent encryption of a plurality of said messages transceived in said second communication mode.

4. The communication system according to claim 1, wherein said first device, upon receipt of said infrared request message, transmits said security message to said second device.

5. The communication system according to claim 4, wherein said security message comprises a plurality of encryption keys for the subsequent encryption of a plurality of said messages transceived in said second communication mode.

6. The communication system according to claim 1, wherein said transceiving means within said first device comprises:
   infrared transceiving means for transceiving infrared signals with said second device in said first communications mode;
   radiofrequency transceiving means for transceiving radiofrequency signals with said second device in said second communications mode; and
   switching means for switching between said infrared and radiofrequency transceiving means.

7. The communication system according to claim 6, wherein said infrared transceiving means comprises:
   a photodetector for receiving said infrared signals from said second device; and
   an infrared emitter for transmitting said infrared signals to said second device.

8. The communication system according to claim 1, wherein said second device comprises a transceiving means therein, said transceiving means within said second device comprising:
   infrared transceiving means for transceiving said infrared signals with said first device in said first communications mode;
   radiofrequency transceiving means for transceiving said radiofrequency signals with said first device in said second communications mode; and
   switching means for switching between said infrared and radiofrequency transceiving means.

9. The communication system according to claim 8, wherein said infrared transceiving means within said second device comprises:
   a photodetector for receiving said infrared signals from said first device; and
   an infrared emitter for transmitting said infrared signals to said first device.

10. The communication system according to claim 1, wherein said communication system is a cordless system.

11. The communication system according to claim 1, wherein said first and second devices are each selected from the group consisting of:
   mobile telephones, home base stations, SIM cards, headsets, computers, printers, plotters, projectors, facsimile devices, pagers, data organizers, computer terminals, scanners, microphones, PC cards, televisions, radios, stereos, VCRs, light devices, dimmers, thermostats, doors, refrigerators, freezers, ovens, washers, dryers, answering machines, home alarms, car alarms, and other peripheral and portable devices.

12. The communication system according to claim 1, wherein said first and second devices communicate on a radiofrequency band ranging from about 2.4 GHz to about 2.483 GHz.

13. The communication system according to claim 12, wherein said band is at about 2.45 GHz.

14. A transceiving device for secure wireless communications in a communications system, said device comprising:
   radiofrequency transceiving means for transceiving a plurality of radiofrequency transmissions within said communications system; and
   infrared transceiving means for transceiving a plurality of infrared transmissions within said communications system;
   wherein said transceiving device switches transceiving from said radiofrequency transceiving means to said infrared transceiving means prior to the transmission of an infrared security message within said communications system; and
   wherein, upon said transceiving device switching transceiving to said infrared transceiving means, said transceiving device transmits an infrared request message to a second transceiving device.

15. The transceiving device according to claim 14, wherein said infrared transceiving means comprises:
   a photodetector for receiving said infrared transmissions; and
   an infrared emitter for transmitting said infrared transmissions.

16. The transceiving device according to claim 15, wherein said infrared emitter comprises a light-emitting diode.

17. The transceiving device according to claim 14, wherein, after the transmission of said infrared security message, said transceiving device switches transceiving to said radiofrequency transceiving means.

18. The transceiving device according to claim 14, wherein said infrared security transmission comprises a plurality of encryption keys for the subsequent encryption of a plurality of said radiofrequency transmissions between said transceiving device and said communications system.

19. The transceiving device according to claim 14, wherein said transceiving devices are each selected from the group consisting of:
   mobile telephones, home base stations, SIM cards, headsets, computers, printers, plotters, projectors, facsimile devices, pagers, data organizers, computer terminals, scanners, microphones, PC cards, televisions, radios, stereos, VCRs, light devices, dimmers, thermostats, doors, refrigerators, freezers, ovens, washers, dryers, answering machines, home alarms, car alarms, and other peripheral and portable devices.

20. The transceiving device according to claim 14, wherein said first and second devices communicate on a radiofrequency band ranging from about 2.4 GHz to about 2.483 GHz.

21. The transceiving device according to claim 20, wherein said band is at about 2.45 GHz.

* * * * *

UNITED STATES PATENT AND TRADEMARK OFFICE
CERTIFICATE OF CORRECTION

PATENT NO. : 6,901,241 B2
DATED : May 31, 2005
INVENTOR(S) : Per Björndahl

It is certified that error appears in the above-identified patent and that said Letters Patent is hereby corrected as shown below:

Column 10,
Line 17, delete "system; and" insert -- system; --

Signed and Sealed this

Ninth Day of August, 2005

JON W. DUDAS
*Director of the United States Patent and Trademark Office*